United States Patent
Düppre et al.

(10) Patent No.: US 10,048,112 B2
(45) Date of Patent: Aug. 14, 2018

(54) WEIGHING SYSTEM FOR WEIGHING MOVABLE COMMODITIES

(71) Applicant: Wipotec Wiege- und Positioniersysteme GmbH, Kaiserslautern (DE)

(72) Inventors: Theo Düppre, Kaiserslautern (DE); Ralf Burkart, Börrstadt (DE); Stefan Mildenberger, Kaiserslautern (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 204 days.

(21) Appl. No.: 15/078,356

(22) Filed: Mar. 23, 2016

(65) Prior Publication Data
US 2016/0282172 A1 Sep. 29, 2016

(30) Foreign Application Priority Data
Mar. 24, 2015 (DE) .......... 10 2015 003 678

(51) Int. Cl.
G01G 21/28 (2006.01)
G01G 21/30 (2006.01)
G01G 19/03 (2006.01)

(52) U.S. Cl.
CPC .......... *G01G 21/28* (2013.01); *G01G 19/03* (2013.01); *G01G 21/30* (2013.01)

(58) Field of Classification Search
CPC ........ G01G 19/03; G01G 21/28; G01G 21/30; G01G 21/23; G01G 11/003
See application file for complete search history.

(56) References Cited

U.S. PATENT DOCUMENTS

| | | | |
|---|---|---|---|
| 4,122,940 A | 10/1978 | Hoffmann | |
| 4,440,249 A * | 4/1984 | Del Rosso | G01G 11/003 177/145 |
| 4,564,077 A * | 1/1986 | Del Rosso | G01G 11/003 177/128 |
| 5,170,857 A * | 12/1992 | Phillips | G01G 11/00 177/145 |
| 5,670,752 A | 9/1997 | Nakajima | |

(Continued)

FOREIGN PATENT DOCUMENTS

| | | |
|---|---|---|
| DE | 2548988 A1 | 5/1977 |
| EP | 0622618 A2 | 11/1994 |
| EP | 1281941 A1 | 2/2003 |

(Continued)

OTHER PUBLICATIONS

Computer translation of JP 2006/071572 from the JPO website. Dec. 6, 2017.*

(Continued)

*Primary Examiner* — Randy Gibson
(74) *Attorney, Agent, or Firm* — The Webb Law Firm (57) ABSTRACT

A weighing system for the dynamic weighing of transported commodities, including a housing with a drive and a weighing cell arranged therein. A drive shaft of the drive is fed through a first housing opening in the horizontal direction laterally out of the housing, and support elements can also be coupled through the same opening to the load receiver of the weighing cell arranged inside the housing.

14 Claims, 6 Drawing Sheets

(56) References Cited

U.S. PATENT DOCUMENTS

2002/0157877 A1   10/2002   Takahashi

FOREIGN PATENT DOCUMENTS

| | | |
|---|---|---|
| JP | 6327835 U | 2/1988 |
| JP | 6117905 A | 4/1994 |
| JP | 6313725 A | 11/1994 |
| JP | 752115 B2 | 6/1995 |
| JP | 8285662 A | 11/1996 |
| JP | 2001317986 A | 11/2001 |
| JP | 200671572 A | 3/2006 |
| JP | 2007101462 A | 4/2007 |
| WO | 2008006783 A1 | 1/2008 |

OTHER PUBLICATIONS

Computer translation of JP 2001/317986 from the JPO website. Dec. 7, 2017.*
Computer translation of WO 2008/006783 from the EPO website. Dec. 7, 2017.*

* cited by examiner

WEIGHING SYSTEM FOR WEIGHING MOVABLE COMMODITIES

CROSS-REFERENCE TO RELATED APPLICATION

This application claims priority to German Patent Application No. 10 2015 003 678.5 filed Mar. 24, 2015, the disclosure of which is hereby incorporated in its entirety by reference.

BACKGROUND OF THE INVENTION

Field of the Invention

The present invention relates to a weighing system.

Description of Related Art

In the production of foodstuffs or in the manufacturing of pharmaceutical products, high demands are placed on the hygiene and cleanability of the machinery, facilities, and devices employed. This also applies to the weighing systems employed. Moreover, automatic scales with conveyors positioned thereon are often used for handling high production volumes. The weight of the commodities to be transported can thus be measured during transport ("dynamic weighing") or during standstill ("static weighing"). The weighing is usually effected automatically, even though non-automatic scales may be also used. In any case high demands are placed on weighing precision. The scale should also be capable of being calibrated and also have a high display resolution. Such weighing systems are frequently cleaned by steam jets, hence both the weighing cell with its force transducer and the motor for driving the conveyor must be protected against the unwanted intrusion of dirt, health-hazardous materials, undesired fluids, abrasion particles, cleaning agents, and the like. In the following, "weighing cell" means a metrological unit with a stationary section forming a so-called "base body" and another section moveable relative to this base body, which is coupled with a load receiver and receives a weight force. This weight force is converted by a force sensor into an analyzable electronic signal. To protect the weighing cell and the motor of the conveyor, according to the prior art the latter can each be arranged in its own housing. The manufacturing effort required for this is quite high, also because the motor is usually positioned near the conveyor, e.g., a conveyor belt, whereas the weighing cell is located underneath the conveyor and carries it as a preload.

JP H075211 B2 proposes providing a common housing for the motor of the conveyor and the weighing cell. However, the housing increases the preload to be carried by the weighing cell, which negatively impacts the transient response of the entire system. In weighing cells that operate according to the electromagnetic force compensation principle, such a design also leads to a higher coil carrier current with accompanying interfering heat generation.

EP 1 281 941 B1 on the other hand opts for a solution in which the jointly configured housing for the motor and the weighing cell does not form any preload for the weighing cell and thus relieves the latter thereof. However, with this solution the motor shaft is led downwards out of the common housing in order to prevent dirt or cleaning agents from accumulating on seals or penetrating into the interior. However, the drive shaft must then be equipped with an expensive bevel gear linkage with bearings. A proportionately longer drive belt is also coupled with the conveyor positioned over the housing. The technical effort is correspondingly high. Furthermore, longer drive belts tend to generate oscillations and vibrations, which negatively impact the required high precision of the weighing result.

The problem addressed by the invention was therefore that of creating a weighing system with a conveyor, which enables the weighing cell as well as the conveyor drive to be protected with only one stationary housing, with the shortest possible distance between the drive shaft of the motor and the conveyor components to be driven. An especially space-saving embodiment of the housing, which simultaneously provides effective protection against the intrusion of dirt or cleaning agents, thus had to be ensured. As the system should also be capable of being integrated in existing machinery or multilane production lines, for example, a space-saving embodiment must be sought. A method for mounting such a weighing system should also be provided.

DESCRIPTION OF RELATED ART

The invention is based on the idea of providing an ideally single-piece, non-preload forming, slip-on housing that jointly accommodates the weighing cell and the conveyor drive in its interior. To reduce the construction effort and in particular the distance of the drive shaft to the conveyor, according to the invention the motor shaft is guided laterally or horizontally out of the stationary housing. In contrast to the prior art, this eliminates the construction effort for coupling, for example, a drive shaft projecting vertically downwards out of the housing with the conveyor to be positioned over the housing. Such a prior art drive coupling would virtually have to "reach around" the housing.

According to the invention, further provision is made such that support elements, which carry the conveyor and which have to be coupled with the load receiver of the weighing cell in the interior of the housing for force transmission purposes, are led out through the same opening in the housing through which the drive shaft is also led. This dual utilization of the housing opening makes it possible to dispense with another opening of the housing, for example for the separate through-feeding of the drive shaft. This simplifies the construction and by having as few openings as possible, in particular sealing is made easier.

The weighing system of the invention, which is preferably configured for the dynamic and automatic weighing of moving commodities, thus comprises a weighing cell with a load receiver and a load transmitter coupled with said load receiver, via which a weight force to be measured can be introduced into the weighing cell in a preferably vertical load introduction direction. To transport the commodities to be weighed via conveyor, further provision is made of a drive, which exerts a preload on the load receiver of the weighing cell via the load transmitter and which has a drive shaft intended to be coupled with suitable components of the conveyor for transmitting a torque. The weighing cell can preferably operate according to the electromagnetic force compensation principle. However, use can also be made of the vibrating string or strain gauge principle, for example.

The load to be weighed can be transferred onto the conveyor by adjacent conveyor means. Alternatively, depositing the commodities onto the conveyor in the vertical direction, for example, for removal after weighing is also conceivable. For this operation, the conveyor can temporarily be allowed to idle or be operated with a constant or dynamically variable conveying speed.

The drive and the weighing cell are protected by a preferably single-piece housing jointly covering both components. The housing is stationary and therefore does not form any preload for the weighing cell, hence it can have a more massive construction than a variant in which the housing does form a preload. It can preferably set on the drive and the weighing cell in the manner of an open-bottomed hood, wherein the two components should be positioned as close to one another as possible for a particularly space-saving design. The housing can be sealed at the bottom by means of a floor plate that simultaneously serves as a stationary base. A first load introduction section arranged in the housing is furthermore coupled with the load transmitter, which is preferably embodied as a simple plate, said load introduction section in particular being used to fasten the conveyor and to transmit its load to the load transmitter and then to the load receiver of the weighing cell.

According to the invention, at least one support element, which bears the conveyor and transmits its partial or entire load to the load transmitter, is jointly inserted in or led through a first opening of the housing, along with the drive shaft. The advantages of the common housing, the simplified drive transmission of drive to the conveyor, and the simplified sealing of the housing are thus combined with each other in a particularly effective manner. The first opening is formed in a vertical wall section of the housing or in any case configured such that the housing interior can be accessed in the horizontal direction from outside the housing through the opening.

In an expedient manner, the first load introduction section is easily accessible through the first opening of the housing so that support elements of the conveyor can be mounted thereon from outside the housing. The first load introduction section is stably configured, for example as a rectangular block with threaded boreholes, for transmission of the forces thus received.

Although the drive shaft can also be led laterally out of the housing laterally or rather above or below this load introduction section, an advantageous embodiment of the invention makes provision such that the drive shaft is led through the first load introduction section. The previously described block can thus have, for example, a central opening through which the drive shaft can be led, whereas the support elements for the conveyor could be fastened around the drive shaft to the load introduction section, for example via an annular flange structure. In the center of the flange and, for example, concentrically to the preferably circular first opening formed in the housing, the drive shaft can then be led out of the housing. In this manner the housing opening can be configured as small as possible while still ensuring a stable attachment of the support elements to the first load introduction section.

The first and/or a second load introduction section or also guide tracks for the drive (see below) can thus be configured monolithically with the load transmitter and/or the load receiver, thereby avoiding heat-induced tension effects. In an advantageous embodiment, the first load introduction section can be embodied as a fastening flange oriented perpendicular to the drive shaft, in order to fasten the drive thereto. This load introduction section then assumes the dual function of fastening the support elements for the conveyor on the one hand and fastening the drive on the other, which simplifies the structure overall and reduces the construction size of the weighing system and of its housing, respectively.

The conveyor is connected to the first load introduction section via one or several support elements through the first housing opening. To this end, use can be made of several interconnected support elements, of which at least one engages on the first load introduction section located in the housing, whereas other support elements can be interconnected. Thus a first support element could be positioned in the first housing opening as an annular flange and screwed onto the first load introduction section there. Another support element, which is likewise annular and widened radially with respect to the first housing opening, could then engage on the first support element, simultaneously cover the gap between the housing and the first support element (with essentially no secondary force connections) and/or fix a gasket for this gap. As a third support element, retaining bolts can in turn engage on the second support element and be used for fastening a rod assembly, which bears the conveyor to be positioned over the housing. The retaining bolts can also be led through the first housing opening to the first load introduction section and fastened there, for example screwed in.

The weighing system should occupy as little construction space as possible so that the housing surrounds the internally-located drive and the weighing cell as closely as possible. Because openings in the sides or on the top side of the housing should be avoided or in any case reduced in number, a housing is thus provided which is open at the bottom and which can be slipped over the components of the weighing system with a vertical downward movement. However, this gives rise to the problem that the horizontally projecting drive shaft, on which, for example, a toothed belt is to be mounted outside the housing, obstructs the vertical positioning process. For this reason, another advantageous embodiment of the invention makes provision such that the drive is moveable in the direction of the drive shaft to and from an insertion position $P_1$ and an operating position $P_2$. In the insertion position $P_1$, according to the invention the drive shaft does not project through the first opening of the housing; instead the drive with its drive shaft is located sufficiently far within the outer boundary that would result from a projection of the housing on a horizontal plane such that the housing can be slipped from above over ("set on") the weighing cell and the entire drive without obstructions. When the housing then assumes a lower end position, the first housing opening according to the invention preferably aligns with an imaginary extension of the drive shaft. The drive can then be moved from the insertion position $P_1$ to the operating position $P_2$, whereby the shaft extends to the outside of the housing so that a drive belt, a chain, or the like leading to the conveyor above the housing can then be hooked up to the shaft. Before the housing is slipped on, a pinion could be mounted on the end of the shaft provided that it and any support elements provided still fit through the opening after the housing is slipped on. With this mounting method, a close-fitting housing can protect the drive and the weighing cell simply by being slipped over them, and the drive shaft is then moved laterally out of the housing into its forward operating position afterwards.

The drive in operation is preferably situated essentially horizontally in the center of the housing in order to focus the center of gravity of the preload-forming components (drive, support elements, conveyor, load transmitter) as much as possible in the center of the load receiver. The displacement can be effected by the drive shaft initially located in the interior of the housing being gripped and then pulled out through the first housing opening of the invention until the drive or motor connected to the shaft contacts a stop. As already explained, this stop can be formed by the first load introduction section. With suitable connection means, in particular boreholes in the load introduction section and threaded boreholes in the drive housing, the drive can be fastened or rather bolted onto the first load introduction section with screws or tool means introduced into the first housing opening of the invention from the outside. The drive and hence the drive shaft are thus secured in the operating position $P_2$, in which the drive shaft extends horizontally through the first housing opening sufficiently far to the outside for coupling a toothed belt, for example, to the conveyor.

In order to enhance the movability of the drive, the latter can be guided by guide means, for instance by tracks with an L-shaped cross section, which are fastened onto the load transmitter, or in any case coupled therewith, for the transmission of a weight force.

With the movability of the drive according to the invention, it is possible to dispense with otherwise-needed slots or cut-outs in the housing, through which the (then non-movable) drive shaft could project during the positioning of the housing. Such openings are difficult to seal, increase manufacturing costs, and reduce the stability of the housing.

The support elements projecting into the first housing opening in the mounted state form a gap between their radial outer surface and the housing wall surrounding the first opening. This gap is required in order to permit a relative movement that must be accounted for, at least theoretically, which the support elements, the drive, and the load introduction section could execute in relation to the housing when weight is applied. By the same token the gap should be kept as small as possible, as it needs to be sealed to prevent the intrusion of dirt or cleaning agents. For example, a circular first opening and a cylindrical support element projecting through said opening would result in an annular gap, which needs to be sealed with a corresponding annular gasket. To check the cleaning results, in an advantageous embodiment of the invention it is ensured that the gasket is visible in the fully mounted state of the weighing system or during operation, respectively, in other words not completely covered by any other support elements on the outside of the housing.

With the horizontal guiding of the support elements through the first housing opening according to the invention, the seal closing this feedthrough is correspondingly oriented in a vertical direction. Any air pressure differentials between the interior of the housing and the surroundings, which would then stress the gasket in the horizontal direction, are thus unable to exert any influence on the weighing result, since the forces arising from the pressure differential on the gasket are perpendicular to the load measurement direction of the weighing cell.

An advantageous embodiment of the invention makes provision such that the gasket lies as much as possible in the plane of the housing wall. In order to bring this about, a support element projecting through the housing opening and preferably configured as a flange is equipped with a sealant contact surface running perpendicular to the drive shaft. This sealant contact surface should preferably align with an outer surface of the housing, or else deviate by no more than three millimeters in the horizontal direction in relation to this outer surface.

A membrane-like annular gasket can thus be positioned on the sealant contact surface of the support element, which gasket extends radially outwards and adjoins the section of the housing surrounding the first housing opening with essentially no horizontal offset. Another practical embodiment of the invention makes provision such that a support element configured as a rotationally symmetric flange on its radial outside has a curved profile in order to redirect a jet of a flowing medium, in particular a cleaning agent, striking this area radially outwards. The purpose of the profile is to protect the gasket from the impact of a water jet, a steam jet, or other jet of high velocity flowing media. An exemplary design of such a profile is explained in more detail in FIG. 3.

For reasons related to symmetry and in particular to stability, according to another advantageous embodiment of the invention provision is made of at least one other support element for the conveyor. On a side of the housing opposite the first housing opening, this support element engages in or projects through a second housing opening. There the other support element engages, in a manner comparable with the first housing opening, with a second load introduction section that is also coupled with the load transmitter. The conveyor is thus braced on both sides of the housing and the load of the housing is transmitted inwardly in the horizontal direction through opposite housing openings to the load introduction sections and from there via the load transmitter to the load receiver of the weighing cell. With this embodiment, the load receiver of the weighing cell is not subjected to a one-sided load and the conveying mechanism can also be fastened in a more stable manner. The specifications of the second housing opening essentially correspond to those of the oppositely arranged first housing opening. However, in contrast to the latter an insertion of a drive shaft is not required here, provided that the drive shaft projecting through the first housing opening is able to ensure the driving of the conveyor. In an expedient manner the two housing openings align, whereas the drive shaft is oriented concentrically to them.

Also conceivable is an embodiment in which two mutually adapted drives can be slid in and out of both sides of the housing in order to allow the housing to be slipped on or set in place in a problem-free manner and for coupling the single conveyor from two sides with a toothed belt or the like. The essentially symmetrical structure of a weighing system of the invention with two oppositely arranged housing openings is explained in more detail with reference to FIG. 2.

It is also possible to allocate several drives inside a housing to different conveyors and operate them independently of one another. This would enable, for example, the configuration of multi-lane systems for which provision is made, in a common housing, of two independently loadable weighing cells for one lane in each case. A first weighing cell could then bear a conveyor braced through the first housing opening, whereas another, second conveyor preferably arranged parallel and adjacent to the first conveyor is born through the second housing opening by the second weighing cell. To save space, for example, the weighing system could be centrally positioned below the two conveyors each defining a lane.

Furthermore, the drives born by independent weighing cells could also serve sequentially (serially) arranged conveyors of the same lane so that within a lane, weighing can take place independently at different conveying positions. Hence a first commodity to be weighed could be weighed on the first conveyor, whereas a second commodity could be weighed or conveyed independently by the downstream or upstream positioned second conveyor.

With independent weighing cells, provision could accordingly be made of independent load transmitters, which in each case each bear the support elements (and in each case a drive in the event of a plurality of drives) such that each weighing cell is served by its own load transmitter.

The two serially arranged and preferably independently operable conveyors can also be carried by a common weighing cell, which could be operated in a targeted manner for weight determination regardless of whether the commodity to be weighed is on the first or the second conveyor.

Although the invention is designed for a conveyor positioned over the housing, the conveyor can also be located below the housing. Support elements and mountings can be constructed for such an underfloor variant and accordingly lead under the housing, whereas in the interior of the housing, the weight force of the conveyor is supplied to the force sensor, unaltered in the vertical downward direction, as compression force. However, the sensor could also receive a tensile force if the conveyor is fastened thereto "in a suspended manner". A feature for the particularly space-saving configuration of the weighing system of the invention arises from the distance of the load introduction sections from the interior wall of the housing. An advantageous embodiment of the invention is thus characterized in that the first and/or a second load introduction section has an outer surface facing the inner wall of the housing, of which the horizontal distance to this inner wall of the housing surrounding the first or second opening is less than 30 mm. The distance is preferably even less than 20 mm, wherein a highly preferable embodiment has less than 10 mm. The closer the load introduction section is to the inner wall of the housing, the easier it is to fasten the support elements through the housing openings from the outside and also to fasten the drive after the latter has been moved into the operating position $P_2$. The narrow distance also contributes to the smallest possible construction size. A method of the invention for mounting a weighing system with a moveable drive comprises at least the following steps:

a) Positioning of the drive (3) in the insertion position ($P_1$)
b) Setting of the housing (5) on the weighing cell and the drive (3)
c) Moving of the drive (3) to the operating position ($P_2$), such that the drive shaft (4) projects through the first housing opening (A).

Other method features, which could complement the aforementioned features a)-c), are as follows:

d) Fastening of at least one support element (6, 7, 8, 6', 7', 8') to the first and/or to a second load introduction section (L, L') and/or fastening of a plurality of support elements (6, 7, 8, 6', 7', 8') to one another;
e) Fastening of at least one sealant (9, 9'), which seals a gap formed between the housing (5) and a support element (6, 7, 8, 6', 7', 8') by the first and/or a second opening (A, A');
f) Fastening of a shaft seal (17), which seals the shaft (4) with respect to a support element (6, 7, 8);
g) Fastening of a force transmission means of a conveyor to the drive shaft (4) so that its rotary movement can be used for the transporting of the commodities;

BRIEF DESCRIPTION OF THE DRAWINGS

An embodiment shall be described in more detail in the following, with reference to figures. Shown are.

DETAILED DESCRIPTION OF THE INVENTION

Figure 1:
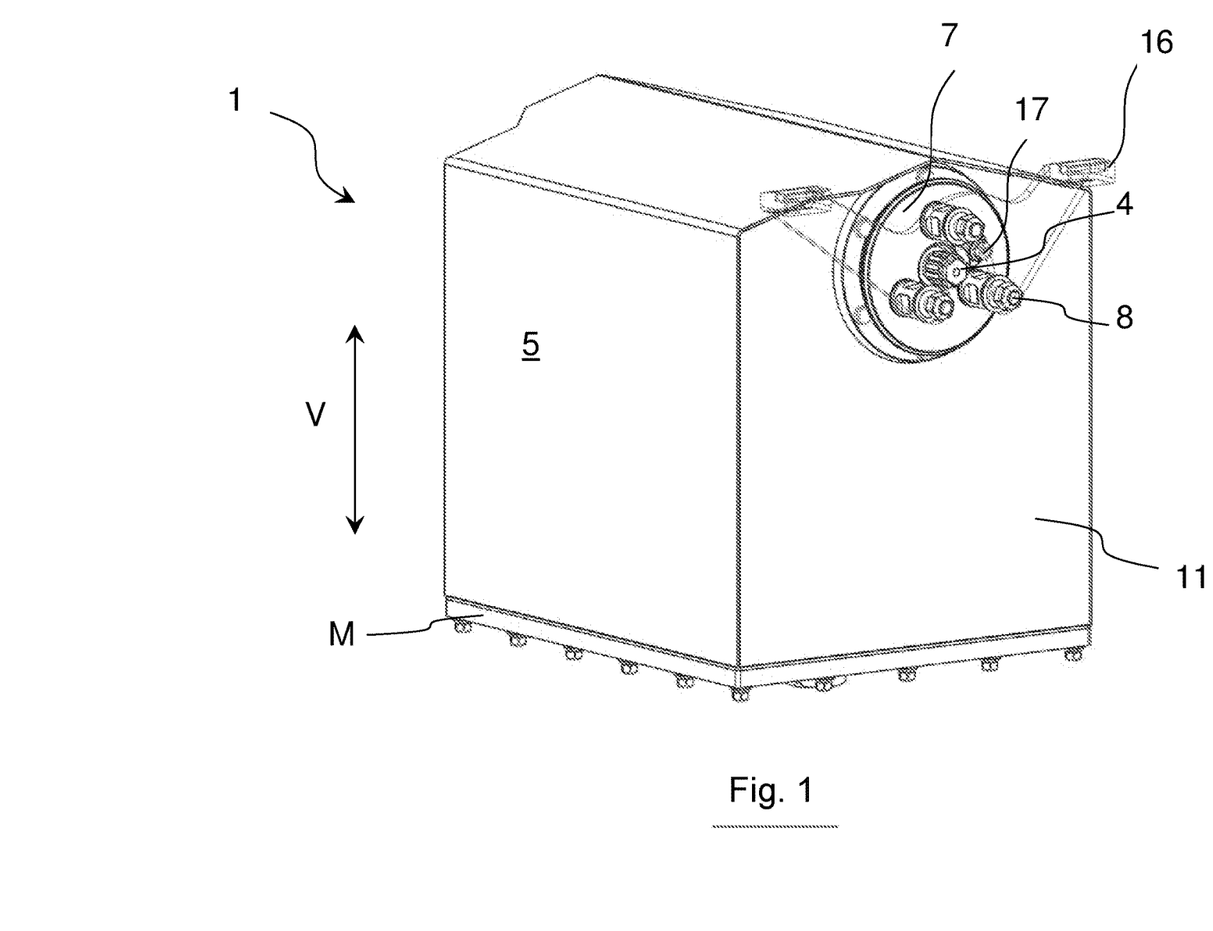
FIG. 1 a view of a weighing system of the invention, with the housing set in place.

FIG. 1 shows a weighing system 1 according to the invention with an essentially rectangular housing 5, which contains components shown in detail in the other figures. The housing 5 can be set on a stationary base M by moving it from above in a downward vertical direction V. It is open at the bottom for this purpose. On a front side 11 of the housing, provision is made of a first circular housing opening A, which is covered by a flange-shaped support element 7 and is therefore not visible in FIG. 1. Three retaining bolts 8 project as support elements in the horizontal direction from the flange 7 for fastening a mounting 16, which in turn is intended to bear a conveyor (not illustrated in any further detail) for the transporting of commodities to be weighed. A protective guard 17 prevents accidental intervention in the band or in a gap formed by the latter when a toothed belt is placed around the pinion.

In the center of the arrangement of the bolts 8, the front end of a drive shaft 4 projects outward from the interior of the housing through the flange 7. A pinion is mounted on the end of the drive shaft 4 for driving a toothed belt to be connected to the conveyor.

Figure 2:
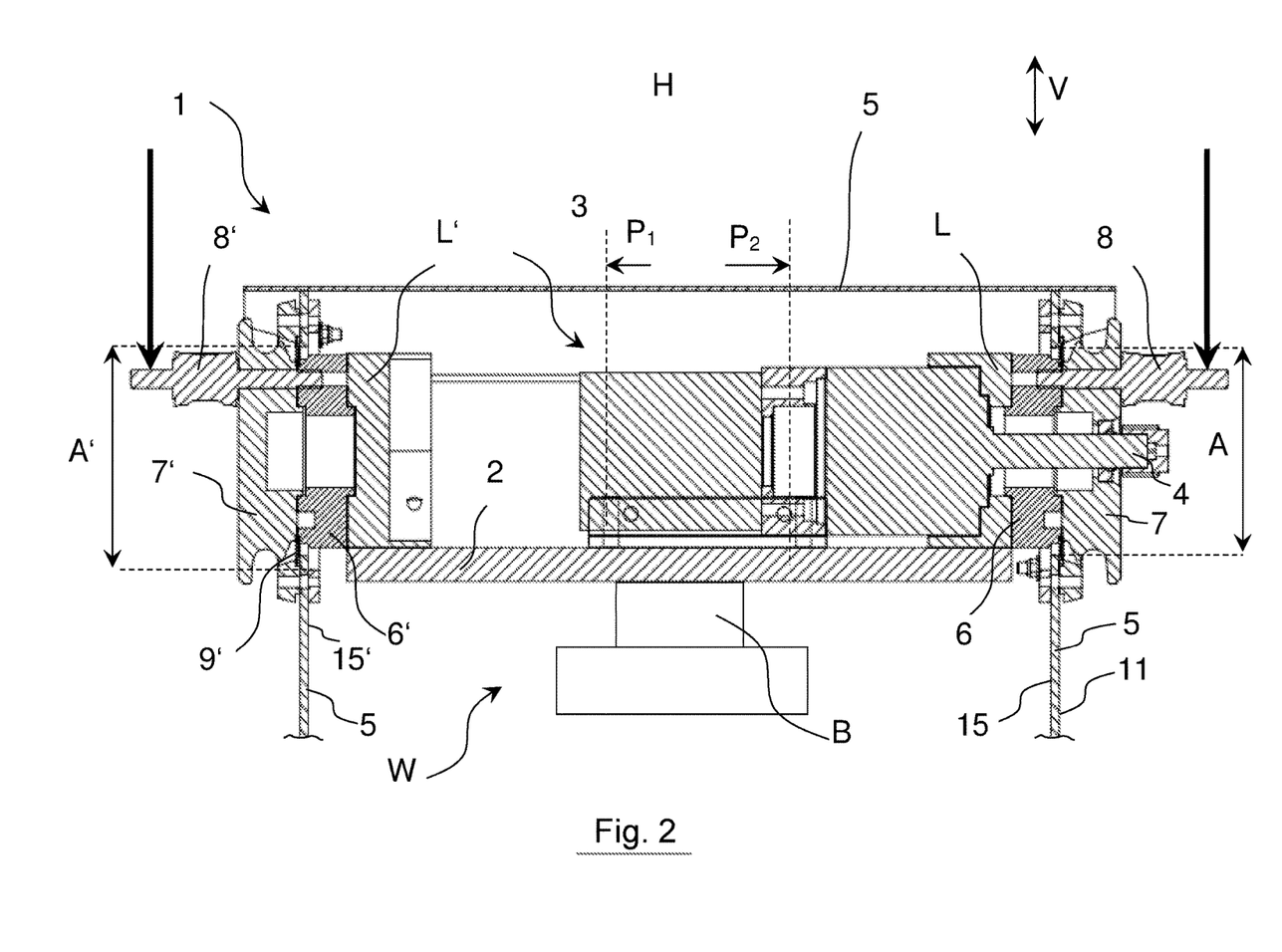
FIG. 2 a cutaway of the top section of the weighing system of FIG. 1.

FIG. 2 shows a cutaway of the top section of the weighing system 1 according to FIG. 1. The housing 5 comprises side parts positioned at right angles to one another and a roof-shaped top part (with partial overlap), which for example are welded together into a sealed stainless steel structure. A load plate serving as a load transmitter 2 can be seen inside the housing 5, which load transmitter is coupled with a load receiver B (configured as a load bolt) of a weighing cell W, which is only shown schematically. The load transmitter 2 receives weight forces in the vertical direction V and transmits them via the load receiver B to a force sensor (not shown) of the weighing cell. The weighing cell should be protected from contamination and from the intrusion of cleaning agent by the housing 5. Two load introduction sections L, L' spaced horizontally from one another, which extend upwards from the load transmitter 2 in a flange-like manner in the vertical direction V, are arranged on the load transmitter 2.

A drive 3, which comprises a motor, a transmission, and a drive shaft 4, rests via L-shaped guide elements on the load transmitter 2 and is movable in the horizontal direction H to and from an insertion position $P_1$ and an operating position $P_2$. In FIG. 2 the drive 3 is arranged in the operating position $P_2$ such that the drive shaft 4 projects to the right out of the housing 5. In doing so the drive shaft 4 passes through the support elements 6 and 7, which are connected as annular flanges to one another or to the first load introduction section L. Details on this emerge from FIG. 3. It is a magnified illustration of the right-hand section of the weighing system 1 according to FIG. 2. Partially visible is the load transmitter 2, on which the first load introduction section L is fastened. The drive 3 has been pushed into the operating position $P_2$ (see FIG. 2), specifically into the flange-like first load introduction section L, where it is connected to the first load introduction section L by screw fittings that can be mounted from outside the housing and which are not shown in any further detail here.

Figure 3:
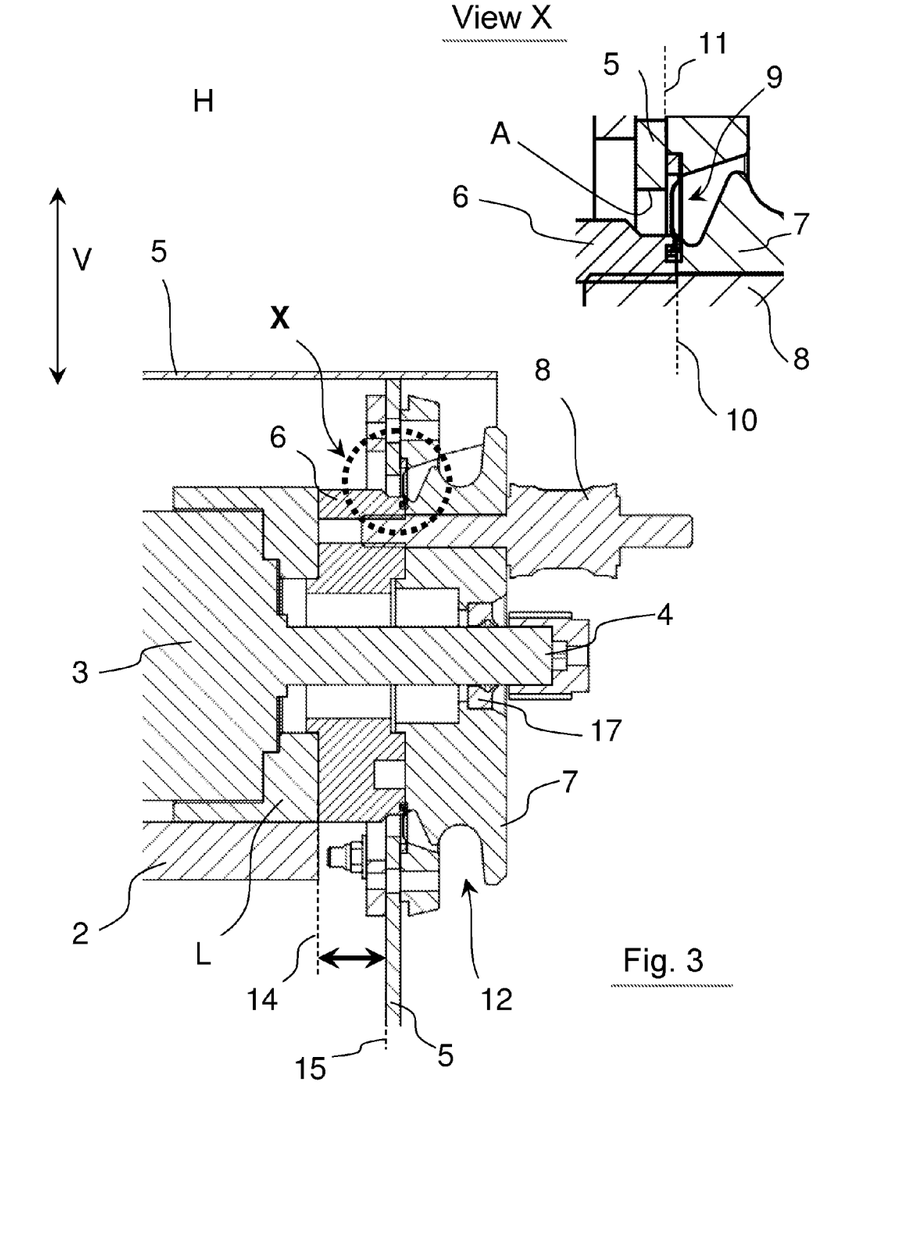
FIG. 3 a cutaway of a housing section, with support elements and a drive shaft protruding through said section, with a magnified part X.

A first support element configured as a connection flange 6 abuts against the first load introduction section L in the horizontal direction H. The support element 6 has a frontal vertical sealant contact surface 10, which is indicated in the detailed view X. There it can be seen that the support element 6 projects through the first housing opening A in the housing 5 in such a way that the sealant contact surface 10 lies essentially flush with the outer surface 11 of the housing 5. Sealant 9 covers the annular gap that is formed within the first housing opening A and around the perimeter of the support element 6. The drive shaft 4 is led through a central borehole in the support element 6.

In the horizontal direction H, another, likewise flange-shaped support element 7 adjoins the first support element 6, which secures the sealant 9 and simultaneously partially covers the same in the horizontal direction. On its radial exterior, the support element 7 is equipped with a curved profile 12 for deflecting flowing medium striking said profile and redirecting it radially to the outside. The purpose of this is to prevent abrasion particles, health-hazardous materials, or cleaning agents from reaching the area of the sealant 9. In addition, a shaft seal 17 is arranged in a central borehole of the support element 7, through which the drive shaft 4 is led.

Several support elements 8 configured as retaining bolts, only one of which is illustrated in FIG. 3, are fastened through the support element 7 to the flange 6 by means of screw fittings and thus press the flange 7 against the flange 6. The retaining bolts 8 are used for securing mountings shown in FIG. 1, which in turn are used for receiving a conveyor for transporting commodities to be weighed.

The first recess A in the housing 5 permits the horizontal passage of the drive shaft 4 as well as the horizontal passage for the introduction of weight forces of the conveyor, which are transmitted via the support elements 8, 7, and 6 to the first load introduction section L and from there to the load transmitter 2 and then to the weighing cell W. A frontal boundary surface 14 of the first load introduction section L is only slightly distanced from the interior surface 15 of the wall of the housing 5, as indicated by the boldface double arrow in FIG. 3. The flange-shaped support element 6 can thus be easily fastened to the first load introduction section L from the outside through the first housing opening A. At the same time this small distance permits a compact embodiment of the housing, which tightly encloses the components located therein without wasting construction space.

Figure 4:
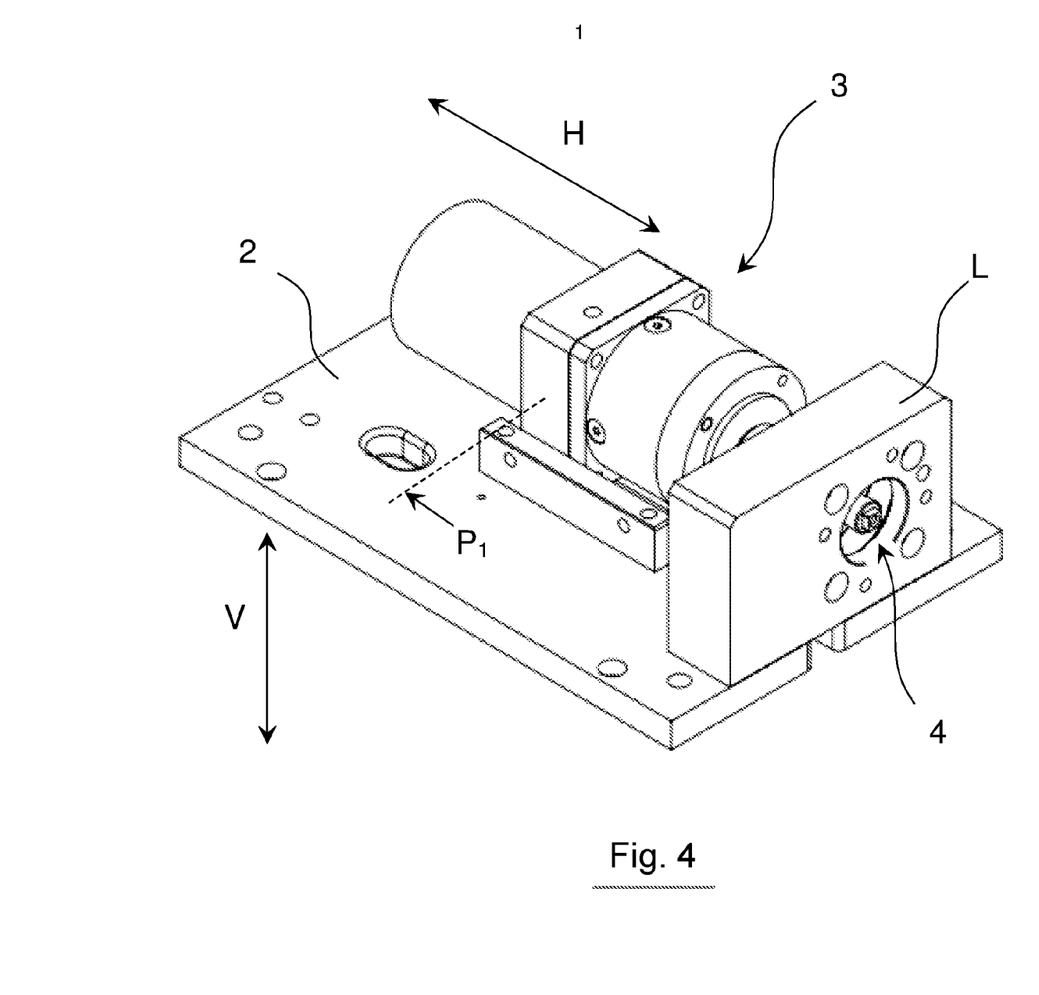
FIG. 4 a perspective view of a drive on a load receiver.

FIG. 4 shows a perspective view of the load transmitter 2 with the drive 3 set thereon. The drive 3 is illustrated in the insertion position $P_1$ here, in which the drive shaft 4 is pulled sufficiently far back in the horizontal direction H so that it does not project all the way through the first load introduction section L and thus enables the housing to be slid on.

Figure 5:
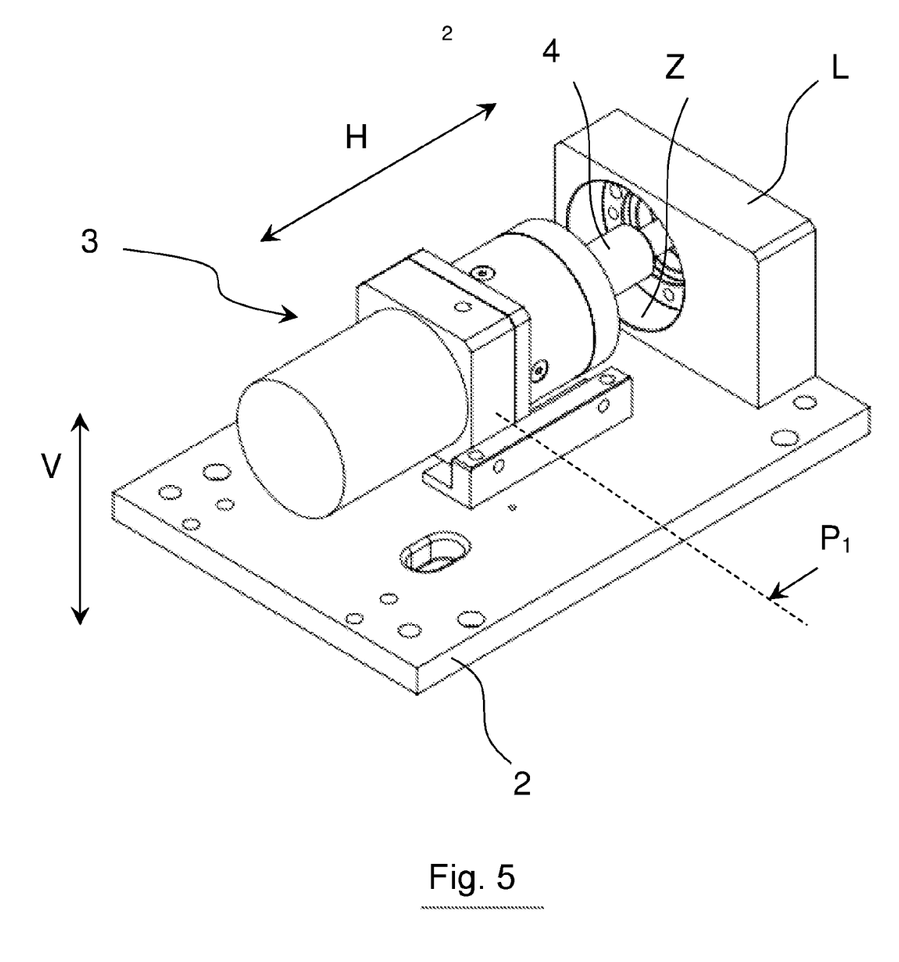
FIG. 5 the illustration of FIG. 4 shown from another perspective.

FIG. 5 shows a back view of the same arrangement. It shows how the drive 3 is guided on the load transmitter 2 in the horizontal direction H via L-shaped guide elements. Furthermore, a flange-like receiving recess serving as a centering collar Z can be seen in the first load application element L, which surrounds, centers, and serves to fasten the housing of the drive 3 in the operating position $P_2$. The first load introduction element L simultaneously forms a horizontal stop for the drive 3.

Figure 6:
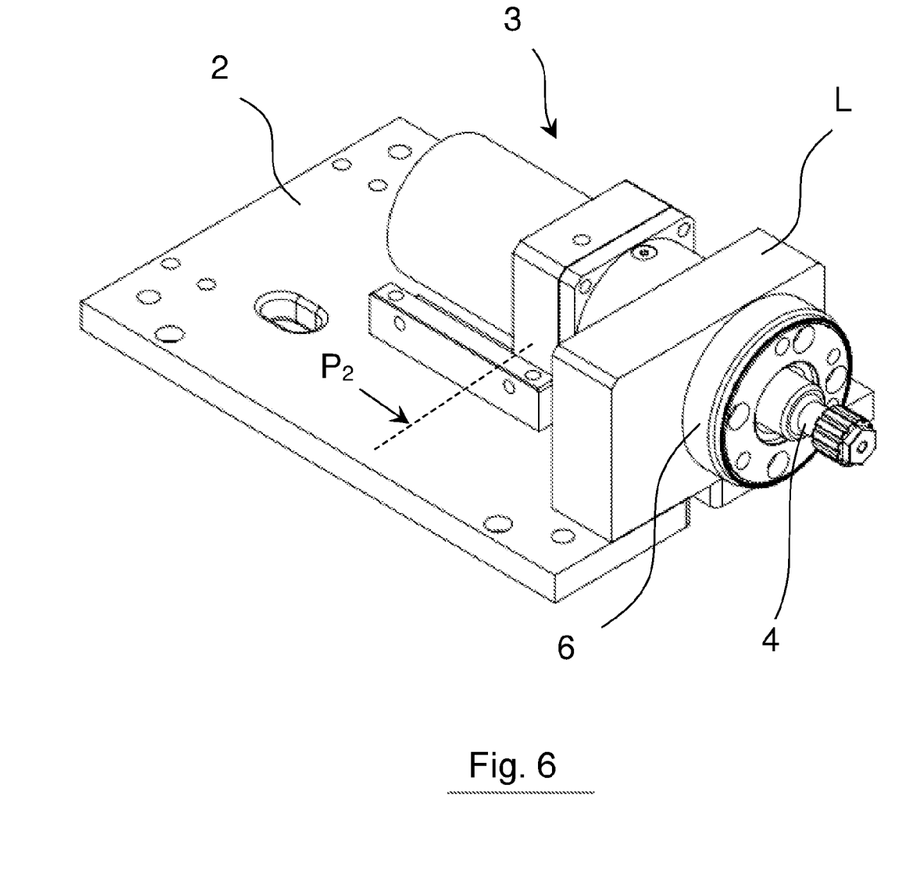
FIG. 6 the load transmitter with the drive moved forward.

This case is illustrated in FIG. 6. There the drive 3 has been moved in the horizontal direction H into the operating position $P_2$. The drive shaft 4 clearly projects out beyond the first load introduction section L. For the sake of clarity, the housing 5 through which the drive shaft 4 would project in this case is not illustrated. Here the flange-like support element 6 has already been connected from the side of the first load introduction section L opposite the drive to said load introduction section so that the sealant 9 can eventually be positioned on the frontal outer perimeter of the flange-like support element 6. In the mounted state, the not illustrated outside 11 of the housing 5 (see view X) is then essentially aligned with the front face 10 of the support element 6 turned away from the first load application element L. For improved receiving of the weight load of the conveyor and for simplifying the construction, the housing 5 of the invention according to FIG. 2 is essentially configured symmetrically in terms of its housing openings. Accordingly, on the side of the housing 5 opposite the first housing opening A, provision is made of a second housing opening A', which is provided in an analogous manner for mounting or passage through support elements 6', 7' and 8'. Only the insertion of a drive shaft on this side of the housing is lacking in the present exemplary embodiment. In the case of loading, in which the conveyor mounted over the housing 5 via the retaining bolts 8, 8' transports commodities to be weighed, the weight force of the conveyor and of the transported commodities is introduced from the outside via the bolts 8, 8', by the flanges 7, 7', 6, and 6' in the horizontal direction H through the housing openings A, A' into the first load introduction section L or the second load introduction section L', respectively. The load introduction sections L, L' in turn introduce the exerted weight force into the load transmitter 2 arranged below, which also receives the weight force of the drive 3 as a preload. The weight force thus transmitted to the load receiver B is converted into an analyzable signal by means of a not illustrated force sensor of the weighing cell W indicated in FIG. 2.

In the insertion position $P_1$ of the drive 3, and before the support elements 6, 7, 8, 6', 7', 8' are mounted, the housing 5 can be slid from above over the load transmitter 2, the drive 3 arranged thereon, and the first or second load introduction section L, L', respectively, since the horizontal inner width of the housing 5 (slightly) exceeds the horizontal breadth of the aforementioned components. In the positioned state of the housing 5, the first and the second housing openings A, A' align with the round flange openings formed in the first and second load introduction sections L, L' so that the support elements 6, 6', 7, 7', 8 and 8' can be mounted on the respective load application elements L, L' from outside the housing through the respective housing opening A, A'. With the common passage of the drive shaft and the fastening elements for the conveyor through one and the same housing opening A, only one sealing with sealant 9 is required in order to seal the interior of the housing.

If for stability reasons an additional comparable housing opening A' is arranged on the side of the housing 5 opposite the first opening A as in the present exemplary embodiment according to FIG. 5, the price for this additional stability for the conveyor positioned on top of the housing is the need of sealing this additional opening A' as well. The support elements 6, 7, and 8 or 6', 7', and 8', respectively, on both sides of the housing 5 perform identical functions here and are thus configured in a comparable manner. For electromagnetic shielding purposes, the latter and/or the motor shaft as well could also be configured as non-conductive or antistatic.

The invention claimed is:
1. A weighing system for weighing movable commodities, comprising
   a) at least one weighing cell with an allocated load receiver,
   b) a load transmitter coupled with the load receiver, via which a weight force to be measured can be introduced in a load introduction direction into the at least one weighing cell, c) at least one preload-forming drive with a drive shaft extending in a horizontal direction for driving a preload-forming and commodity-transporting conveyor,
d) a stationary housing jointly covering and sealing the at least one drive and the at least one weighing cell, and
e) at least one first load introduction section coupled with the load transmitter and arranged in the housing, wherein,
f) at least one support element of the conveyor and the drive shaft jointly project in the horizontal direction into or through a first opening of the housing.

2. The weighing system according to claim 1, wherein the drive shaft is guided through the first load introduction section.

3. The weighing system according to claim 1, wherein the first load introduction section is configured as a fastening flange oriented perpendicular to the drive shaft for securing the drive.

4. The weighing system according to claim 1, wherein at least one support element projecting into the first opening engages on the first load introduction section.

5. The weighing system according to claim 1, wherein the drive can be moved in the direction from an insertion position, in which the drive shaft does not project through the first opening, into an operating position, in which the drive shaft projects through the first opening.

6. The weighing system according to claim 1, wherein provision is made of sealant, which seals a gap formed by the first opening between the housing and a support element.

7. The weighing system according to claim 1, wherein a support element has a sealant contact surface running perpendicular to the shaft, which aligns with an outer surface of the housing or is not horizontally offset in relation to the outer surface by more than three millimeters.

8. The weighing system according to claim 1, wherein at least one other support element of the conveyor, on a housing side opposite the first opening in the direction, projects into or through a second housing opening on that side, where it is connected to a second load introduction section coupled with the load transmitter such that the conveyor is braced on both sides of the housing.

9. The weighing system according to claim 8, wherein the first and/or a second load introduction section has an outer surface facing the inner wall of the housing, of which the horizontal distance to the inner side of the housing surrounding the first or second opening is less than 30 mm.

10. A method for mounting a weighing system according to claim 5, comprising at least the following steps:
a) positioning of the drive in the insertion position
b) setting of the housing on the weighing cell and the drive
c) moving of the drive to the operating position so that the drive shaft projects though the first housing opening.

11. The method according to claim 10, further comprising at least one or more of the following steps:
d) fastening of at least one support element to the first and/or to a second load introduction section and/or fastening of several support elements to one another;
e) fastening of at least one sealant, which seals a gap formed by the first and/or a second opening between the housing and a support element;
f) fastening of a shaft seal, which seals the drive shaft with respect to a support element;
g) fastening of a force transmission means of a conveyor to the drive shaft so that its rotary movement can be used for transporting the commodities.

12. The weighing system according to claim 6, wherein the support element is configured as a flange.

13. The weighing system according to claim 7, wherein the support element is configured as a flange.

14. The weighing system according to claim 9, wherein the horizontal distance to the inner side of the housing surrounding the first or second opening is less than 10 mm.

* * * * *

UNITED STATES PATENT AND TRADEMARK OFFICE
CERTIFICATE OF CORRECTION

PATENT NO. : 10,048,112 B2
APPLICATION NO. : 15/078356
DATED : August 14, 2018
INVENTOR(S) : Theo Düppre et al.

Page 1 of 1

It is certified that error appears in the above-identified patent and that said Letters Patent is hereby corrected as shown below:

In the Claims

Column 12, Line 16, Claim 10, delete "though" and insert -- through --

Signed and Sealed this
First Day of January, 2019

Andrei Iancu
*Director of the United States Patent and Trademark Office*